(12) United States Patent
Baryudin et al.

(10) Patent No.: US 9,235,346 B2
(45) Date of Patent: Jan. 12, 2016

(54) DYNAMIC MAP PRE-FETCHING FOR IMPROVED SEQUENTIAL READS OF A SOLID-STATE MEDIA

(71) Applicant: LSI Corporation, San Jose, CA (US)

(72) Inventors: Leonid Baryudin, Oakland, CA (US); Zhiqing Zhang, Shanghai (CN); Xin Song, San Jose, CA (US); Yun Shun Tan, Shanghai (CN); Lin Feng Chen, Shanghai (CN)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 178 days.

(21) Appl. No.: 14/094,846

(22) Filed: Dec. 3, 2013

(65) Prior Publication Data

US 2015/0074328 A1     Mar. 12, 2015

Related U.S. Application Data

(63) Continuation-in-part of application No. 14/022,781, filed on Sep. 10, 2013.

(51) Int. Cl.
| | |
|---|---|
| *G06F 12/00* | (2006.01) |
| *G06F 3/06* | (2006.01) |
| *G06F 12/02* | (2006.01) |
| *G06F 12/08* | (2006.01) |

(52) U.S. Cl.
CPC ............ *G06F 3/0616* (2013.01); *G06F 3/0665* (2013.01); *G06F 3/0679* (2013.01); *G06F 12/0246* (2013.01); *G06F 12/0862* (2013.01)

(58) Field of Classification Search
CPC . G06F 12/0246; G06F 3/0679; G06F 3/0616; G06F 3/0665; G06F 11/1008; G06F 12/02; G06F 12/0862

USPC .................................. 711/100, 102–104, 165
See application file for complete search history.

(56) References Cited

U.S. PATENT DOCUMENTS

| | | | |
|---|---|---|---|
| 6,574,716 B2 | 6/2003 | Dovi | |
| 6,633,957 B2 | 10/2003 | Bates, Jr. et al. | |
| 6,898,670 B2 | 5/2005 | Nahum | |
| 7,099,190 B2 | 8/2006 | Noguchi et al. | |
| 7,430,693 B2 | 9/2008 | Noguchi et al. | |

(Continued)

OTHER PUBLICATIONS

X. Zhang, F. Cai, C. Shi, "Low-Power LDPC Decoding Based on Iteration Prediction," 2012 IEEE International Symposium on Circuits and Systems (ISCAS), pp. 3041-3044, May 2012 (USA).

*Primary Examiner* — Jasmine Song
(74) *Attorney, Agent, or Firm* — Hamilton DeSanctis & Cha (57) ABSTRACT

Described embodiments provide a solid-state drive (SSD) including a media controller and a solid-state media. A control processor of the media controller determines a logical address, a transfer size, and map data based on the logical address and transfer size, associated with a read request received from a host device. Based on the logical address and a sequential zone defined based on one or more previous read requests, the control processor determines whether the received read request is a sequential read. A map data pre-fetch size is adjusted based on the transfer size of the received read request and whether the received read request is a sequential read. A corresponding portion of the map data is transferred from the solid-state media to a map cache coupled to the control processor, the transferred portion having a size equal to the adjusted map data pre-fetch size.

28 Claims, 7 Drawing Sheets

(56) References Cited

U.S. PATENT DOCUMENTS

| | | |
|---|---|---|
| 7,453,728 B2 | 11/2008 | Noguchi et al. |
| 7,493,450 B2 | 2/2009 | Bearden |
| 7,574,443 B2 | 8/2009 | Bahar et al. |
| 7,607,065 B2 | 10/2009 | Bickerstaff et al. |
| 7,818,525 B1 | 10/2010 | Frost et al. |
| 7,844,691 B2 | 11/2010 | Gopalakrishnan |
| 8,019,849 B1 | 9/2011 | Lopilato et al. |
| 8,060,797 B2 | 11/2011 | Hida et al. |
| 8,082,466 B2 | 12/2011 | Tanaka et al. |
| 8,171,125 B2 | 5/2012 | Gopalakrishnan |
| 8,171,380 B2 | 5/2012 | Yang et al. |
| 8,189,379 B2 | 5/2012 | Camp et al. |
| 8,190,842 B2 | 5/2012 | Frost et al. |
| 8,219,861 B2 | 7/2012 | Hida et al. |
| 8,225,047 B2 * | 7/2012 | Yano et al. .................... 711/137 |
| 8,281,220 B2 | 10/2012 | Kitahara |
| 8,327,066 B2 | 12/2012 | Heo et al. |
| 8,341,487 B2 | 12/2012 | Blanksby et al. |
| 8,429,351 B1 | 4/2013 | Yu et al. |
| 2009/0216936 A1 | 8/2009 | Chu et al. |
| 2010/0180183 A1 | 7/2010 | Hung et al. |
| 2010/0246244 A1 | 9/2010 | Shimomura et al. |
| 2011/0225346 A1 | 9/2011 | Goss et al. |
| 2012/0185744 A1 | 7/2012 | Varnica et al. |
| 2012/0226835 A1 | 9/2012 | Thomas |
| 2012/0239972 A1 | 9/2012 | Shibata et al. |
| 2012/0246525 A1 | 9/2012 | Shibata et al. |
| 2012/0260148 A1 | 10/2012 | Hughes et al. |
| 2012/0278450 A1 | 11/2012 | Soltis |

\* cited by examiner

DYNAMIC MAP PRE-FETCHING FOR IMPROVED SEQUENTIAL READS OF A SOLID-STATE MEDIA

CROSS-REFERENCE TO RELATED APPLICATIONS

This application is a continuation-in-part, and claims the benefit of the filing date, of U.S. patent application Ser. No. 14/022,781 filed Sep. 10, 2013, the teachings of which are incorporated herein in their entireties by reference.

The subject matter of this application is related to U.S. patent application Ser. No. 13/464,433 filed May 4, 2012, Ser. No. 13/567,025 filed Aug. 4, 2012, Ser. No. 13/600,464 filed Aug. 31, 2012, Ser. No. 13/729,966 filed Dec. 28, 2012, Ser. No. 13/748,260 filed Jan. 23, 2013, and Ser. No. 13/963,074 filed Aug. 9, 2013, the teachings of all of which are incorporated herein in their entireties by reference.

BACKGROUND

Flash memory is a non-volatile memory (NVM) that is a specific type of electrically erasable programmable read-only memory (EEPROM). One commonly employed type of flash memory technology is NAND flash memory. NAND flash memory requires small chip area per cell and is typically divided into one or more banks or planes. Each bank is divided into blocks; each block is divided into pages. Each page includes a number of bytes for storing user data, error correction code (ECC) information, or both.

There are three basic operations for NAND devices: read, write and erase. The read and write operations are performed on a page-by-page basis. Page sizes are generally $2^N$ bytes of user data (plus additional bytes for ECC information), where N is an integer, with typical user data page sizes of, for example, 2,048 bytes (2 KB), 4,096 bytes (4 KB), 8,192 bytes (8 KB) or more per page. A "read unit" is the smallest amount of data and corresponding ECC information that can be read from the NVM and corrected by the ECC, and might typically be between 4K bits and 32K bits (e.g., there is generally an integer number of read units per page). Pages are typically arranged in blocks, and an erase operation is performed on a block-by-block basis. Typical block sizes are, for example, 64, 128 or more pages per block. Pages must be written sequentially, usually from a low address to a high address within a block. Lower addresses cannot be rewritten until the block is erased. Associated with each page is a spare area (typically 100-640 bytes) generally used for storage of ECC information and/or other metadata used for memory management. The ECC information is generally employed to detect and correct errors in the user data stored in the page.

A hard disk is accessed by a host device based on a logical block address (LBA). For a hard disk write operation, old data is over-written by new data at the same physical LBA. An NVM is accessed based on a logical page number (LPN). However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate controller chip with firmware, to maintain a record of logical-to-physical mappings of each LBA to the current page number where its data is stored. The mapping data might also be used to perform "garbage collection" to erase data that is "stale" or out-of-date. Further, because NVM blocks can be erased only a limited number of times before device failure, mapping data might also be employed to track failed blocks over the operational life of the NVM (e.g., over a rated number of program/erase (P/E) cycles for NAND flash).

For SSDs that store mapping data in the NVM, retrieving map data from the NVM can occur frequently under typical host workloads and, thus, negatively impact the bandwidth available to transfer actual user data to/from the NVM as the channel(s) are used to transfer the mapping data. Thus, an improved mechanism for retrieving map data from the NVM is needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a solid-state drive (SSD) including a media controller and a solid-state media. A control processor of the media controller determines a logical address, a transfer size, and map data based on the determined logical address and transfer size, associated with a read request received from a host device. Based on the determined logical address and a sequential zone defined based on one or more previous read requests, the control processor determines whether the received read request is a sequential read request. A map data pre-fetch size is adjusted based on the transfer size of the received read request and whether the received read request is a sequential read request. A corresponding portion of the map data is transferred from the solid-state media to a map cache coupled to the control processor, the transferred portion having a size equal to the adjusted map data pre-fetch size. Based on the map data, media addresses of the solid-state media associated with the logical address and transfer size are determined and user data is transferred from the media addresses to the host device.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

Described embodiments provide a solid-state drive (SSD) including a media controller and a solid-state media. A control processor of the media controller determines a logical address, a transfer size, and map data based on the determined logical address and transfer size, associated with a read request received from a host device. Based on the determined logical address and a sequential zone defined based on one or more previous read requests, the control processor determines whether the received read request is a sequential read request. A map data pre-fetch size is adjusted based on the transfer size of the received read request and whether the received read request is a sequential read request. A corresponding portion of the map data is transferred from the solid-state media to a map cache coupled to the control processor, the transferred portion having a size equal to the adjusted map data pre-fetch size. Based on the map data, media addresses of the solid-state media associated with the logical address and transfer size are determined and user data is transferred from the media addresses to the host device.

Table 1 defines a list of acronyms employed throughout this specification as an aid to understanding the described embodiments:

TABLE 1

| ATS | Aggregated Transfer Size | CAM | Content Addressable Memory |
|---|---|---|---|
| DMP | Dynamic Map Pre-fetching | ECC | Error Correction Code |
| eDRAM | Embedded Dynamic Random Access Memory | EEPROM | Electrically Erasable Programmable Read-Only Memory |
| FLM | First Level Map | FW | Firmware |
| HDD | Hard Disk Drive | IC | Integrated Circuit |
| I/F | Interface | I/O | Input/Output |
| LBA | Logical Block Address | LPN | Logical Page Number |
| LUN | Logical Unit | MA | Media Address |
| MLC | Multi-Level Cell | MLM | Multi-Level Map |
| MP1 | Map data read Phase 1 | MP2 | Map data read Phase 2 |
| MPS | Map data Pre-fetch Size | MRS | Map Read Size |
| NVM | Non-Volatile Memory | PCI-E | Peripheral Component Interconnect Express |
| P/E | Program/Erase | PVT | Process, Voltage, Temperature |
| SAS | Serial Attached SCSI | SATA | Serial Advanced Technology Attachment |
| SCSI | Small Computer System Interface | SLC | Single Level Cell |
| SLM | Second Level Map | SoC | System on Chip |
| SRAM | Static Random Access Memory | SRIO | Serial Rapid Input/Output |
| SSD | Solid-State Disk | SZ | Sequential Zone |
| TS | Transfer Size | UR1 | User data Read phase 1 |
| UR2 | User data Read phase 2 | USB | Universal Serial Bus |

Figure 1:
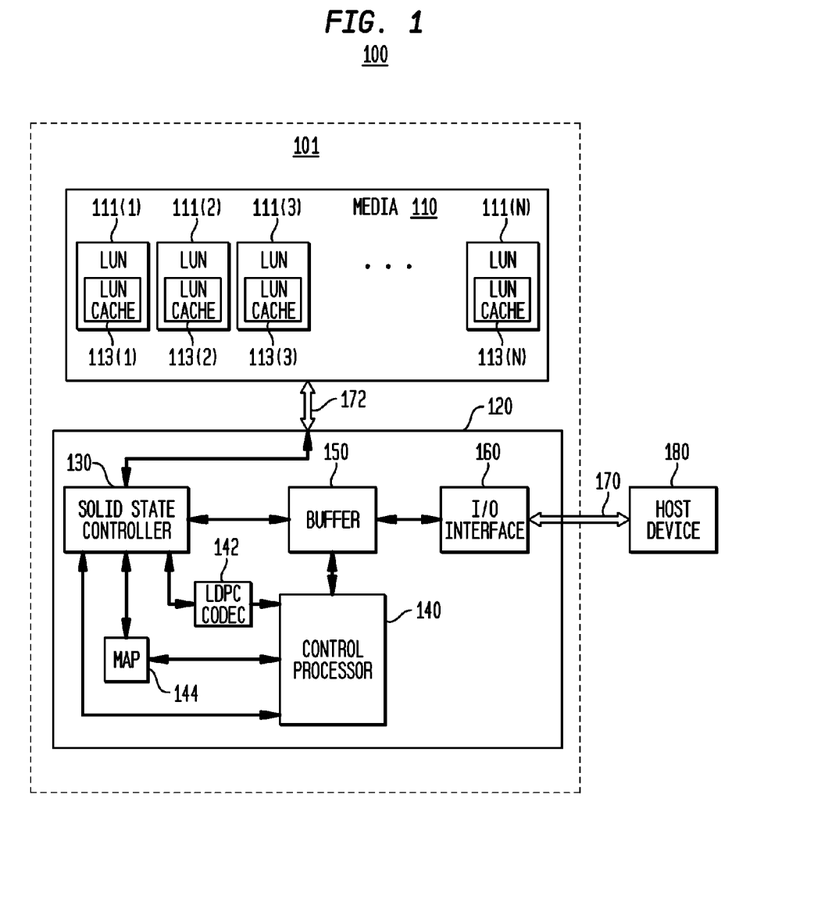
FIG. 1 shows a block diagram of a flash memory storage system in accordance with exemplary embodiments.

FIG. 1 shows a block diagram of non-volatile memory (NVM) storage system 100. NVM storage system 100 includes media 110, which is coupled to media controller 120 by media interface 172. Media 110 might be implemented as a NAND flash solid-state disk (SSD), a magnetic storage media such as a hard disk drive (HDD), or as a hybrid solid-state and magnetic system. As shown in FIG. 1, media 110 might include one or more physical memories (e.g., non-volatile memories, NVMs), such as multiple flash chips, shown as flash Logical Units (LUNs) 111(1)-111(N). Each flash LUN 111(1)-111(N) might have an associated cache shown as LUN caches 113(1)-113(N). As shown in FIG. 1, media 110 and media controller 120 are collectively referred to as SSD 101. Media controller 120 includes solid-state controller 130, control processor 140, buffer 150 and I/O interface 160. Media controller 120 controls transfer of data between media 110 and host device 180 that is coupled to communication link 170. Media controller 120 might be implemented as a system-on-chip (SoC) or other integrated circuit (IC). Solid-state controller 130 might be used to access memory locations in media 110, and might typically implement low-level, device specific operations to interface with media 110. Buffer 150 might be a RAM buffer employed to act as a cache for control processor 140 and/or as a read/write buffer for operations between solid-state media 110 and host device 180. For example, data might generally be temporarily stored in buffer 150 during transfer between solid-state media 110 and host device 180 via I/O interface 160 and link 170. Buffer 150 might be employed to group or split data to account for differences between a data transfer size of communication link 170 and a storage unit size (e.g., read unit size, page size, sector size, or mapped unit size) of media 110. Buffer 150 might be implemented as a static random-access memory (SRAM) or as an embedded dynamic random-access memory (eDRAM) internal to media controller 120, although buffer 150 could also include memory external to media controller 120 (not shown), which might typically be implemented as a double-data-rate (e.g., DDR-3) DRAM.

Control processor 140 communicates with solid-state controller 130 to control data access (e.g., read or write operations) data in media 110. Control processor 140 might be implemented as one or more Pentium®, Power PC®, Tensilica® or ARM processors, or a combination of different processor types (Pentium® is a registered trademark of Intel Corporation, Tensilica® is a trademark of Tensilica, Inc., ARM processors are by ARM Holdings, plc, and Power PC® is a registered trademark of IBM). Although shown in FIG. 1 as a single processor, control processor 140 might be implemented by multiple processors (not shown) and include software/firmware as needed for operation, including to perform threshold optimized operations in accordance with described embodiments. Control processor 140 is in communication with low-density parity-check (LDPC) coder/decoder (codec) 142, which performs LDPC encoding for data written to media 110 and decoding for data read from media 110. Control processor 140 is also in communication with map 144, which is used to translate between logical addresses of host operations (e.g., logical block addresses (LBAs) for read/write operations, etc.) and physical addresses on media 110. As employed herein, the term LBA is synonymous with HPA (Host Page Address).

Communication link 170 is used to communicate with host device 180, which might be a computer system that interfaces with NVM system 100. Communication link 170 might be a custom communication link, or might be a bus that operates in accordance with a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other similar interface link for connecting a peripheral device to a computer.

In general, media controller 120 executes commands received from host device 180. At least some of the commands write data to media 110 with data sent from host device 180, or read data from media 110 and send the read data to host device 180. Media controller 120 employs one or more data structures to map logical memory addresses (e.g., LBAs included in host operations) to physical addresses of the media. When an LBA is written in an SSD, the LBA is generally written to a different physical location each time, and each write updates the map to record where data of the LBA resides in the non-volatile memory (e.g., media 110). For example, in a system such as described in International Patent Application no. PCT/US2012/049905 filed Aug. 8, 2012 and incorporated by reference herein, media controller 120 employs a multi-level map structure (e.g., map 144) that includes a leaf level and one or more higher levels. The leaf level includes map pages that each has one or more entries. A logical address, such as an LBA of an attached media (e.g., media 110), is looked up in the multi-level map structure to determine a corresponding one of the entries in a particular one of the leaf-level pages. The corresponding entry of the LBA contains information associated with the LBA, such as a physical address of media 110 associated with the LBA. In some implementations, for example as described in U.S. patent application Ser. No. 14/022,781 filed Sep. 10, 2013, the corresponding entry further comprises an indication as to whether the corresponding entry is valid or invalid, and optionally whether the LBA has had the TRIM command run on it ("trimmed") or has not been written at all. For example, an invalid entry is able to encode information, such as whether the associated LBA has been trimmed, in the physical location portion of the invalid entry.

To speed the look-up of LBAs, a map cache (not shown) of at least some of the leaf-level pages might be maintained by map 144. In some embodiments, at least a portion of the map data structures are used for private storage that is not visible to host device 180 (e.g., to store logs, statistics, mapping data, or other private/control data of media controller 120).

As described herein, map 144 converts between logical data addressing used by host device 180 and physical data addressing used by media 110. For example, map 144 converts between LBAs used by host device 180 and block and/or page addresses of one or more flash dies of media 110. For example, map 144 might include one or more tables to perform or look up translations between logical addresses and physical addresses.

Figure 2:
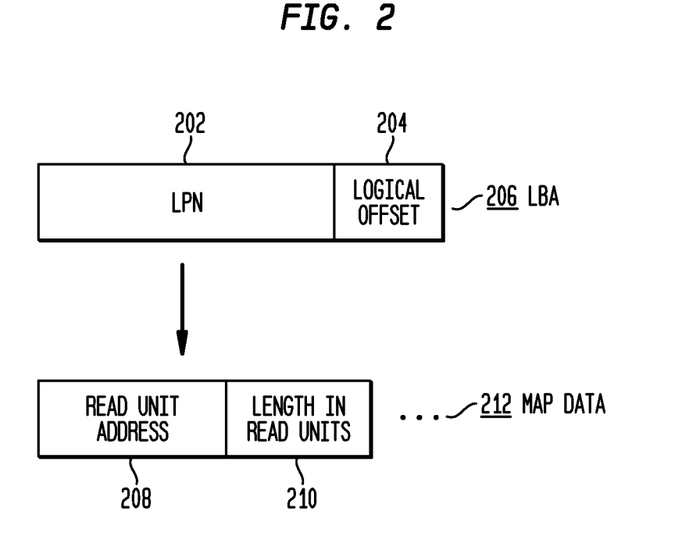
FIG. 2 shows a block diagram of an exemplary mapping of a logical page number (LPN) portion of a logical block number (LBA) of the flash memory storage system of FIG. 1.

Data associated with each LBA is stored at a corresponding physical address of media 110, either in a fixed, non-compressed size, or in a respective, compressed size. As described herein, a read unit is a finest granularity of media 110 that is independently readable, such as a portion of a page of media 110. The read unit might include (or correspond to) check bits and/or redundancy data of an error-correcting code (ECC) along with all data protected by the ECC. FIG. 2 illustrates selected details of an embodiment of mapping an LPN portion of an LBA by map 144. As shown in FIG. 2, LBA 206 includes Logical Page Number (LPN) 202 and logical offset 204. Map 144 translates LPN 202 into map data 212, which includes read unit address 208 and length in read units 210 (and perhaps other map data, as indicated by the ellipsis). Map data 212 might typically be stored as a map entry into a map table of map 144. Map 144 might typically maintain one map entry for each LPN actively in use by system 100. As shown, map data 212 includes read unit address 208 and length in read units 210. In some embodiments, a length and/or a span are stored encoded, such as by storing the length of the data associated with the LPN as an offset from the span in all (or a portion) of length in read units 210. The span (or length in read units) specifies a number of read units to read to retrieve the data associated with the LPN, whereas the length (of the data associated with the LPN) is used for statistics, for example to track an amount of used space in each block of the SSD. Typically, the length has a finer granularity than the span.

In some embodiments, a first LPN is associated with a first map entry, a second LPN (different from the first LPN, but referring to a logical page of a same size as the logical page referred to by the first LPN) is associated with a second map entry, and the respective length in read units of the first map entry is different from the respective length in read units of the second map entry. In such embodiments, at a same point in time, the first LPN is associated with the first map entry, the second LPN is associated with the second map entry, and the respective read unit address of the first map entry is the same as the respective read unit address of the second map entry such that data associated with the first LPN and data associated with the second LPN are both stored in the same physical read unit of media 110.

Figure 3:
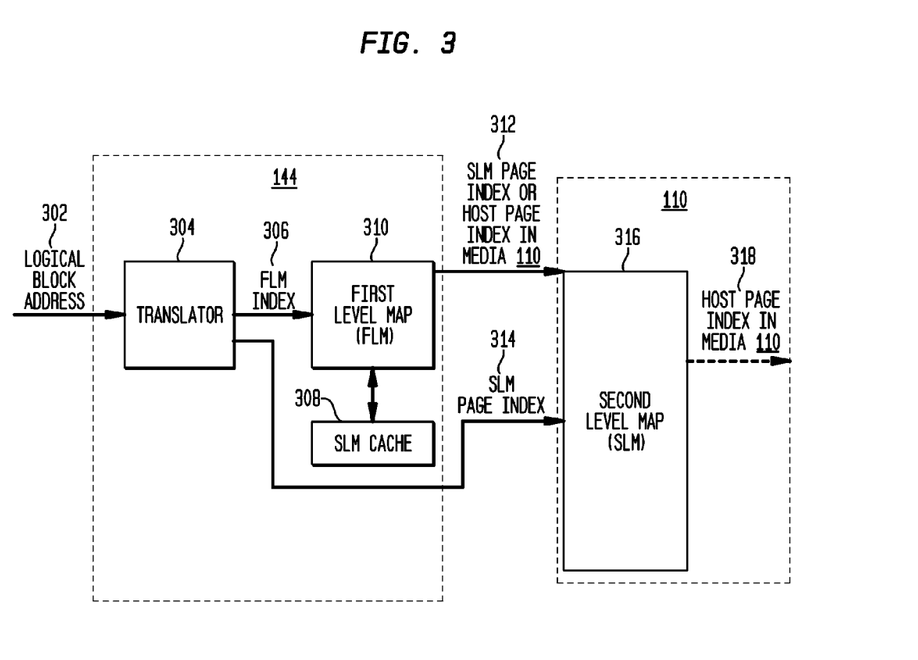
FIG. 3 shows a block diagram of an exemplary two-level mapping structure of the flash memory storage system of FIG. 1.

In various embodiments, map 144 is one of: a one-level map; a two-level map including a first level map (FLM) and one or more second level (or lower level) maps (SLMs) to associate the LBAs of the host protocol with the physical storage addresses in media 110. For example, as shown in FIG. 3, FLM 310 is maintained on-chip in media controller 120, for example in map 144. In some embodiments, a non-volatile (though slightly older) copy of FLM 310 is also stored on media 110. Each entry in FLM 310 is effectively a pointer to a SLM page (e.g., one of SLMs 316). SLMs 316 are stored in media 110 and, in some embodiments, some of the SLMs are cached in an on-chip SLM cache of map 144 (e.g., SLM cache 308). An entry in FLM 310 contains an address (and perhaps data length/range of addresses or other information) of the corresponding second-level map page (e.g., in SLM cache 308 or media 110). As shown in FIG. 3, map 144 might include a two-level map with a first-level map (FLM) 310 that associates a first function (e.g., a quotient obtained when dividing the LBA by the fixed number of entries included in each of the second-level map pages) of a given LBA (e.g., LBA 302) with a respective address in one of a plurality of second-level maps (SLMs) shown as SLM 316, and each SLM associates a second function (e.g., a remainder obtained when dividing the LBA by the fixed number of entries included in each of the second-level map pages) of the LBA with a respective address in media 110 corresponding to the LBA.

For example, as shown in FIG. 3, translator 304 receives an LBA (LBA 302) corresponding to a host operation (e.g., a request from host 180 to read or write to the corresponding LBA on media 110). Translator 304 translates LBA 302 into FLM index 306 and SLM Page index 314, for example, by dividing LBA 302 by the integer number of entries in each of the corresponding SLM pages 316. In described embodiments, FLM index 306 is the quotient of the division operation, and SLM Page index 314 is the remainder of the division operation. Employing the dividing operation allows for SLM pages 316 to include a number of entries that is not a power of two, which might allow SLM pages 316 to be reduced in size, lowering write amplification of media 110 due to write operations to update SLM pages 316. FLM index 306 is used to uniquely identify an entry in FLM 310, the entry including an SLM page index (314) corresponding to one of SLM pages 316. As indicated by 312, in instances where the SLM page corresponding to the SLM page index of the FLM entry is stored in SLM cache 308, FLM 310 might return the physical address of media 110 corresponding to LBA 302. SLM page index 314 is used to uniquely identify an entry in SLM 316, the entry corresponding to a physical address of media 110 corresponding to LBA 302, as indicated by 318. Entries of SLM 316 might be encoded as a read unit address (e.g., the address of an ECC-correctable sub-unit of a flash page) and a length of the read unit.

SLM pages 316 (or a lower-level of a multi-level map (MLM) structure) might all include the same number of entries, or each of SLM pages 316 (or a lower-level of a MLM structure) might include a different number of entries. Further, the entries of SLM pages 316 (or a lower-level of a MLM structure) might be the same granularity, or the granularity might be set for each of SLM pages 316 (or a lower-level of a MLM structure). In exemplary embodiments, FLM 310 has a granularity of 4 KB per entry, and each of SLM pages 316 (or a lower-level of a MLM structure) has a granularity of 8 KB per entry. Thus, for example, each entry in FLM 310 is associated with an aligned eight-sector (4 KB) region of 512 B LBAs and each entry in one of SLM pages 316 is associated with an aligned sixteen-sector (8 KB) region of 512 B LBAs.

In embodiments employing a two-level map structure or an MLM structure, one or more lower-level map pages (e.g., SLM pages 316 or leaf-level map pages of an MLM), might be stored in a cache of map 144 (shown in FIG. 3 as SLM cache 308). For example, in a two-level map such as shown in FIG. 3, FLM index 306 is used to uniquely identify one of SLM pages 316. According to various embodiments, one or more caching techniques are used to look-up the FLM index and determine if the corresponding SLM page is in the cache (a hit) or is not (a miss). A fully associative cache, such as using a Content-Addressable Memory (CAM) for the lookup, might be used in some implementations. For example, the CAM might operate substantially as described in related to U.S. patent application Ser. No. 13/600,464 filed Aug. 31, 2012. In other embodiments, other cache structures, such as a multi-way set-associative cache, can be employed such that each entry has an associated index or address used to track information associated with the SLM page currently in the cache at that index or address.

In many embodiments, to reduce cost, the map cache will not be large enough to store all the SLM pages, so only required portions of the map table (e.g., required ones of SLM pages 316) are pre-fetched into the map cache to perform the host operation. For example, a host read command typically contains a Logical Block Address (LBA) and Transfer Size (TS) for the read operation. Typically, a host read command is sequential if the LBA plus the TS of a previous command equals the LBA of a current command. Otherwise, the host read commands are considered to be random.

Figure 4:
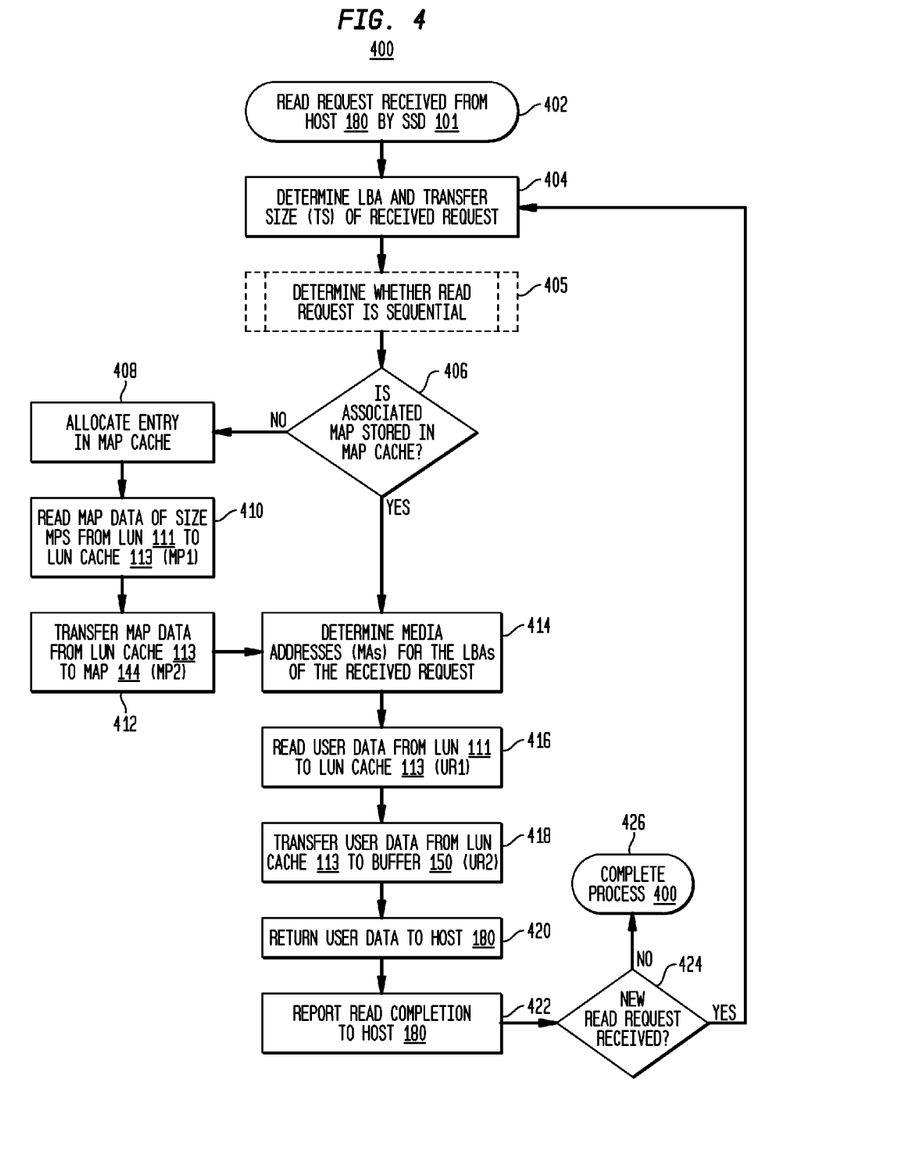
FIG. 4 shows an exemplary flow diagram of a host read request operation employed by the flash memory storage system of FIG. 1.

FIG. 4 shows a flow diagram of process 400 for performing a read operation received from host 180 by SSD 101. At step 402, SSD 101 receives a read request from host 180, for example over communication link 170. At step 404, SSD 101 determines the starting LBA and TS associated with the read operation. As indicated by the dashed line, step 405 might optionally be performed in embodiments employing Dynamic Map Pre-fetching (DMP). At step 405, media controller 120 determines whether the received read request is a sequential read request. Based on whether the request is sequential, some embodiments might modify the amount of map data (map pre-fetch size or "MPS") that is pre-fetched from media 110 during steps 410 and 412. Step 405 will be described in greater detail in regard to FIG. 5.

At step 406, map 144 determines whether the map data associated with the LBA range of the determined LBA and TS is stored in the map cache (e.g., whether there is a cache hit or miss for the associated map data in the map cache, for example SLM cache 308). If, at step 406, there is a cache hit, then process 400 proceeds to step 414. If, at step 406, there is a cache miss, then at step 408 one or more entries in the map cache are allocated for the map data associated with the determined LBA range. At step 410, the map data for the LBA range is pre-fetched from media 110 in a first stage ("MP1") that reads the data from the flash cells (e.g., LUNs 111) to a local flash cache (e.g., LUN caches 113). At step 412, the map data for the LBA range is transferred in a second stage ("MP2") from the local flash cache to the cache of map 144. At step 414, the media addresses (MAs) of the LBA range of the read request are determined based on the map data.

A steps 416 and 418, media controller 120 reads the requested data from media 110 in two stages. At step 416, the requested user data stored at the determined MAs is transferred from one or more of LUNs 111 to the associated LUN caches 113 ("UR1"). At step 418, the requested user data is transferred from LUN caches 113 to buffer 150 ("UR2") for preparation for delivery to host 180 (e.g., to be formed into packets for transfer in accordance with the communication protocol employed by communication link 170). At step 420, the requested user data is transferred to host 180. Once all the requested user data is transferred, at step 422 SSD 101 reports command completion to host 180. At step 424, if another read request is received from host 180, process 400 returns to step 404 to process the next read request. Otherwise, if no subsequent read requests are received, at step 426, process 400 completes.

In many embodiments, host requests might be received by SSD 101 in "chunks" where multiple host requests are received before SSD 101 begins processing any request, or where SSD 101 frequently has multiple outstanding host requests queued while processing a previously received request. In such a case, SSD 101 tracks the exact sequence of the received host requests. Thus, SSD 101 can improve access to both map and user data, thus improving overall data throughput to host 180.

As shown in FIG. 4, in some embodiments, SSD 101 might pre-fetch a fixed amount of map data (map pre-fetch size or "MPS") into the map cache. However, by using a fixed MPS, it is likely that every few user data reads, SSD 101 will have to pre-fetch additional map data. The actual number of user data reads between map data pre-fetches depends on how many map entries are pre-fetched each time. As shown in FIG. 4, map data is pre-fetched in a two stage process MP1 (e.g., step 410) and MP2 (e.g., step 412). In most embodiments, MP1 is more time consuming than MP2. Since user data is also stored in the same LUNs (e.g., 111) and reading user data involves a similar two stage process (e.g., UR1 at step 416 and UR2 at step 418), it is likely that the local flash cache (e.g., 113) will be polluted by subsequent user data reads (e.g., the user data will overwrite the map data). Thus, each time map data is pre-fetched from media 110, the pre-fetching starts at MP1, even if the required map data had just been read into the local flash cache (e.g., 113) for the previous read request. Thus, employing a fixed MPS might waste time and bandwidth for re-reading map data. Such a case is common when the map pre-fetch size (MPS) is smaller than the map read size (MRS). Thus, in embodiments employing a fixed MPS, a design trade-off should be made for having a relatively small MPS to handle random, relatively small host read requests (since only a few map entries might be needed per each small, random access), or having a relatively large MPS to handle sequential and/or large host read requests (the larger the MPS, the fewer the MP1 and/or MP2 operations that need to be performed).

Further, the map read size (MRS) is not required to be of the same size as the MPS (e.g., the amount of map data pre-fetched each time map data is pre-fetched). The map read size (MRS) is the amount of data to read an entire map page from media 110. The map data stored on media 110 is arranged in chunks of ECC units (e.g., similarly as is user data stored on media 110), and the map page size of media 110 is not necessarily equal to the flash page size of media 110. For example, a single map page might be smaller than the flash page size (e.g., the map page only uses a portion of the flash page), or a single map page might be larger than the flash page size (e.g., uses two or more flash pages, thus crossing LUN page boundaries). Thus, if a map page occupies more than one flash page, described embodiments determine which of the flash pages are needed based on the required portion of map data and read only the needed flash pages (e.g., MPS) instead of reading the entire map page (e.g., all of the flash pages for a given map page, or "MRS").

Thus, some embodiments might employ a dynamically sized MPS to improve performance of SSD 101 based on real-time load characteristics. For example, described embodiments might dynamically define the MPS based on sequential host requests or the transfer size of one or more requests. The longer the sequence of requests (and/or the larger the transfer size), the larger MPS will be set and, thus, the more map data that will be pre-fetched into the map cache. By increasing the amount of map data pre-fetched into the map cache, MP1 (and possibly also MP2) operations will be reduced, thus allowing user data to be returned to host 180 with fewer read delays. If the host requests are random (and/or the transfer size is small), the smaller MPS will be set, thus reducing the length of MP1 and MP2 operations since the map data will be fetched for each read request. Thus, described embodiments employ a "sequential zone" (SZ). A received host request is considered as sequential if the start LBA of the received request falls within (or contiguous with) the LBA range of the previously received read request (the "sequential zone"). This reduces MP1 operations that are generally more time consuming than MP2 operations to transfer the larger amount of data.

Figure 5:
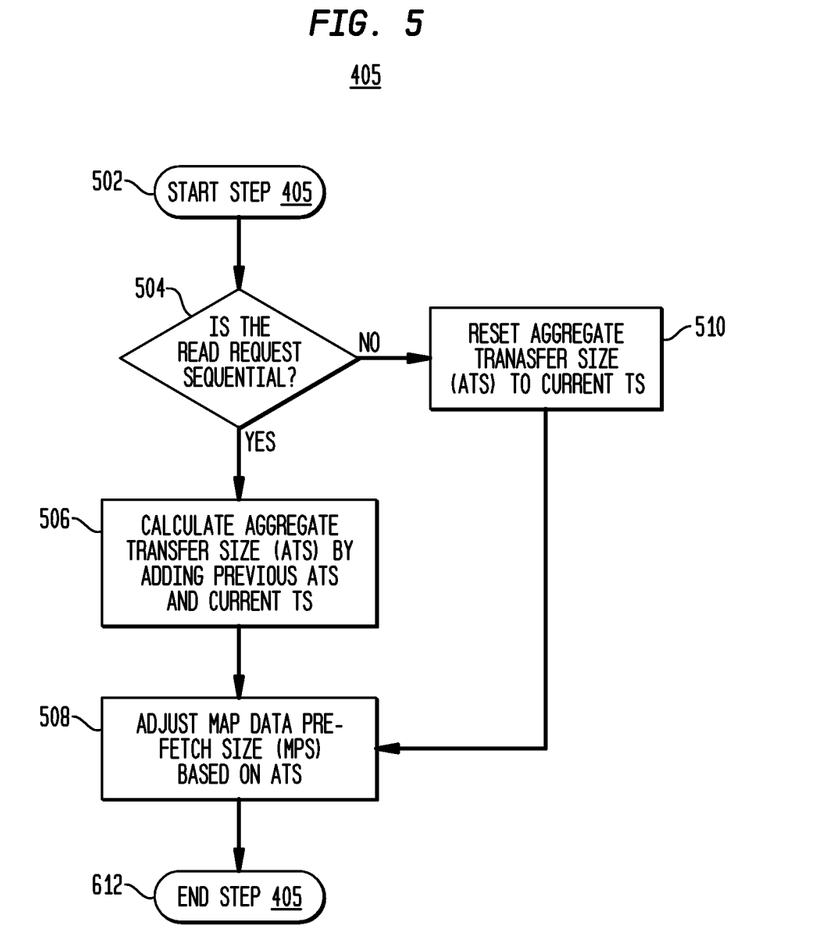
FIG. 5 shows additional detail of a sequential operation detection step of the host read request operation of FIG. 4.

FIG. 5 shows greater detail of step 405 of FIG. 4. As shown in FIG. 5, at step 502, step 405 is started. At step 504, media controller 120 determines whether the current read request is sequential with a previous read request. In some embodiments, media controller 120 determines whether the current read request is sequential by determining whether the starting LBA of the current read request is within the same sequential zone (SZ) as the ending LBA of one or more previous read requests. Otherwise, the current read request is determined to be random. If, at step 504, the current read request is sequential, then at step 506, media controller 120 determines an aggregate transfer size (ATS) for the one or more sequential read requests. The ATS is determined by accumulating the transfer size (TS) of each of the one or more sequential read requests by adding the TS of the current read request to the previous value of the ATS. Process 405 then proceeds to step 508. If, at step 504, the current read request is random (or non-sequential), then at step 510, the value of the ATS is set to the value of the TS for the current read request. Process 405 the proceeds to step 508.

At step 508, the map data pre-fetch size (MPS) is adjusted based on the value of ATS determined at either step 506 or step 508 (depending on whether the current read request is sequential or random). As ATS increases, MPS is increased to handle sequential requests (and also random requests that have a large transfer size) to reduce MP1 and MP2 processing delays. If ATS decreases (e.g., for a small, random read request), then MPS is decreased to the minimum value that will process the entire transfer size to reduce MP2 processing delays by only transferring the smallest amount of map data needed.

Thus, described embodiments employing DMP might improve sequential read performance for SSDs that employ a small/limited size map cache, enhance audio/video editing and playing and improve file copy speed between drives (e.g., improve the speed of any operation that involves large sequential reads of the media), reduce system boot time (e.g., boot records are stored sequentially), and reduce power consumption by the SSD by reducing redundant media access.

For a typical embodiment operating without Dynamic Map Pre-fetching (DMP), the fixed MPS value should not be set too large in order to avoid impacting the performance of SSD 101 under random (or non-sequential) workloads. In a typical embodiment, each MP1 operation requires 70 us, and the time for each MP2 operation is linearly related to the size of MPS (with some lead-time overhead). A typical fixed MPS might be set at 32 map entries to meet random performance requirements, but in such an instance a single MP1 operation would not read enough map entries to perform 4K aligned host read requests.

Figure 6:
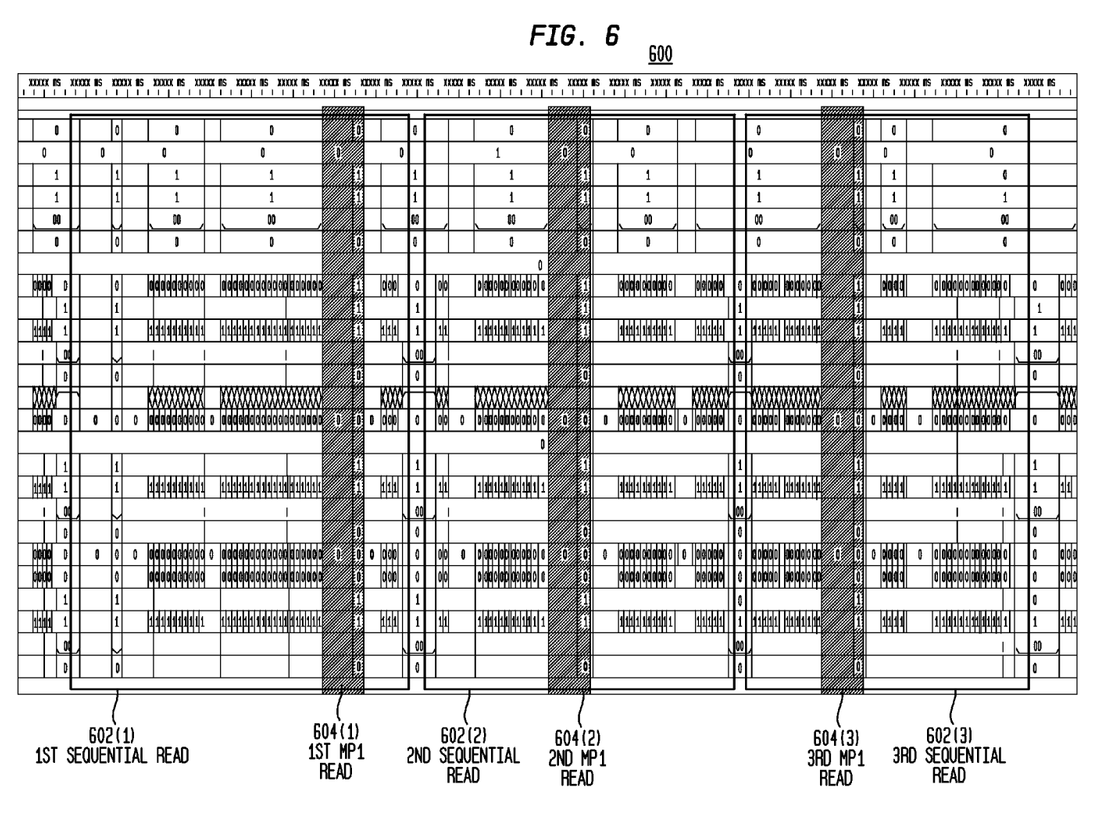
FIG. 6 shows an exemplary timing diagram of a read request operation employing a fixed map data read size in accordance with FIG. 4.
Figure 7:
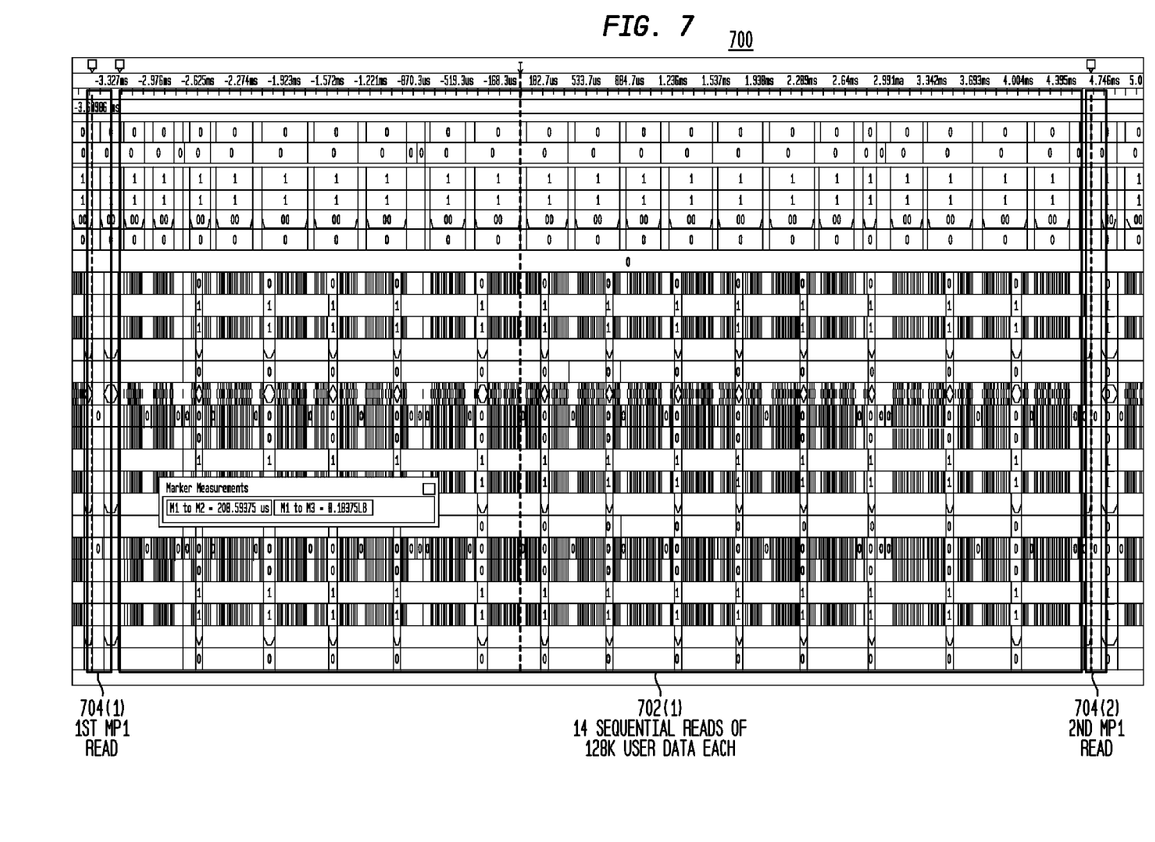
FIG. 7 shows an exemplary timing of a read request operation employing a dynamically sized map data read size in accordance with FIG. 4.

For example, for a sequential host read request with an aggregated 128K transfer size, media controller 120 would have to re-read the same map data repeatedly from media 110 (e.g., multiple repeated MP1 and MP2 operations for the same map data) thus introducing extra 70 us overheads for each MP1 operation, as can be seen in the exemplary waveform of FIG. 6. As shown in FIG. 6, there are three sequential 128K host reads shown as 602(1)-602(3). Each of read operations 602(1)-602(3) includes a corresponding MP1 map read operation shown as 604(1)-604(3). As shown in FIG. 6, for this embodiment, each 128K read costs about 700 us in total map read time, thus, in the exemplary case shown in FIG. 6, re-reading the map data (MP1) represents a performance loss of approximately 10%. Operating with DMP, the MPS is increased to 448 entries after detection of the sequential host requests (e.g., enough map entries to perform the entire transfer size of the sequential operation) and, as shown in FIG. 7, the overhead is reduced to one 70 us MP1 operation (e.g., 704(1)) for every fourteen 128K host reads (shown as 702(1)) instead of the previous 1:1 overhead as shown in FIG. 6.

Thus, as described herein, described embodiments provide a solid-state drive (SSD) including a media controller and a solid-state media. A control processor of the media controller determines a logical address, a transfer size, and map data based on the determined logical address and transfer size, associated with a read request received from a host device. Based on the determined logical address and a sequential zone defined based on one or more previous read requests, the control processor determines whether the received read request is a sequential read request. A map data pre-fetch size is adjusted based on the transfer size of the received read request and whether the received read request is a sequential read request. A corresponding portion of the map data is transferred from the solid-state media to a map cache coupled to the control processor, the transferred portion having a size equal to the adjusted map data pre-fetch size. Based on the map data, media addresses of the solid-state media associated with the logical address and transfer size are determined and user data is transferred from the media addresses to the host device.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in non-transitory tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. Unless explicitly stated otherwise, each numerical value and range should be interpreted as being approximate as if the word "about" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of the described embodiments might be made by those skilled in the art without departing from the scope expressed in the following claims.

We claim:

1. A solid-state drive (SSD) comprising a media controller and a solid-state media, the media controller in communication with a host device, the media controller comprising:
    a map cache;
    a control processor coupled to the map cache and configured to:
        determine a logical address, a transfer size, and map data based on the determined logical address and transfer size, associated with a received current read request from the host device;
        determine, based on the determined logical address and a sequential zone defined based on one or more previous read requests, whether the current read request is a sequential read request;
        adjust a map data pre-fetch size based on the transfer size of the current read request and whether the current read request is a sequential read request by adding the transfer size of the current read request with an aggregate transfer size of the one or more previous read requests when the current read request is a sequential read request;
        transfer a corresponding portion of the map data from the solid-state media to the map cache, the transferred portion having a size equal to the adjusted map data pre-fetch size;
        determine, based on the corresponding map data, one or more media addresses of the solid-state media associated with the determined logical address and transfer size; and
        transfer user data from the one or more determined media addresses of the solid-state media to the host device.

2. The media controller of claim 1, wherein adjusting the map data pre-fetch size further includes
    set the map data pre-fetch size equal to the aggregate transfer size, to reduce a number of map data transfers between the solid-state media and the map cache to process the sequential read requests.

3. The media controller of claim 2, wherein, by setting the map data pre-fetch size equal to the aggregate transfer size, the media controller is configured to achieve at least a 10% data throughput increase.

4. The media controller of claim 1, wherein to adjust the map data pre-fetch size, the control processor is configured to:
when the current read request is a non-sequential read request:
set the map data pre-fetch size equal to a predefined size based on the transfer size of the current read request to reduce an amount of map data transferred between the solid-state media and the map cache to process the current read request.

5. The media controller of claim 4, wherein the predefined size comprises a smallest amount of data needed to process the entire transfer size of the current read request.

6. The media controller of claim 1, wherein, to transfer map data including the corresponding map data from the solid-state media to a map cache of the media controller, the media controller is configured to:
determine, based on the at least one logical address and transfer size, whether the corresponding map data is stored in the map cache;
if the required map data is stored in the map cache, the map cache is configured to return a cache index of the map cache entry storing the required map data to the control processor.

7. The media controller of claim 6, wherein, if the corresponding map data is not stored in the map cache, the control processor is configured to:
allocate a number of entries in the map cache to store the corresponding map data, the number of allocated entries based on the adjusted map data pre-fetch size;
transfer the map data including the corresponding map data from a logical unit of the solid-state media to a local cache of the solid-state media, the transfer having a size equal to the adjusted map data pre-fetch size; and
transfer the map data including the corresponding map data from the local cache of the solid-state media to the map cache of the media controller, the transfer having a size equal to the adjusted map data pre-fetch size.

8. The media controller of claim 1, wherein, to transfer user data from the one or more media addresses of the solid-state media to the host device, the media controller is configured to:
transfer the user data from the media addresses in a logical unit of the solid-state media to a local cache of the solid-state media;
transfer the user data from the local cache of the solid-state media to a buffer of the media controller; and
form one or more host protocol packets to transfer the user data from the buffer to the host device over a communication link operating in accordance with the host protocol.

9. The media controller of claim 8, wherein the media controller is configured to:
when all of the user data of a read request is transferred to the host device, report completion of the read request to the host device.

10. The media controller of claim 1, wherein the control processor is configured to:
determine whether a subsequent read request is received from the host device; and
process the subsequent read request as the current read request.

11. The media controller of claim 1, wherein the map data comprises a multi-level map having a plurality of leaf-level map pages, the plurality of leaf-level map pages stored in the solid-state media, each leaf-level map page comprising a plurality of map entries, each entry associated with one or more physical addresses of the solid-state media.

12. The media controller of claim 1, wherein the map data comprises a multi-level map, the multi-level map comprising:
a second-level map having a plurality of second-level map pages, each of the second-level map pages having a plurality of entries, each entry configured to store a physical address of the solid state media; and
a first-level map having a plurality of entries, each entry associated with a second-level map page, the first-level map configured to associate the at least one logical address and address range to at least one of the second-level map pages.

13. The media controller of claim 1, wherein the sequential zone is defined based on a logical address range of the one or more previous read requests, and the current read request is within the sequential zone if the determined logical address of the current read request is within the logical address range of the one or more previous read requests.

14. The media controller of claim 1, wherein the media controller is implemented as a System-on-Chip (SoC).

15. A method of processing, by a solid-state drive (SSD) comprising a media controller and a solid-state media, a request received from a host device, the method comprising:
determining, by a control processor of the media controller, a logical address, a transfer size, and map data based on the determined logical address and transfer size, associated with a received current read request from the host device;
determining, by the control processor, based on the determined logical address and a sequential zone defined based on one or more previous read requests, whether the current read request is a sequential read request;
adjusting, by the control processor, a map data pre-fetch size based on the transfer size of the current read request and whether the current read request is a sequential read request by adding the transfer size of the current read request with an aggregate transfer size of the one or more previous read requests when the current read request is a sequential read request;
transferring a corresponding portion of the map data from the solid-state media to a map cache coupled to the control processor, the transferred portion having a size equal to the adjusted map data pre-fetch size;
determining, based on the corresponding map data, one or more media addresses of the solid-state media associated with the determined logical address and transfer size; and
transferring user data from the one or more determined media addresses of the solid-state media to the host device.

16. The method of claim 15, wherein adjusting the map data pre-fetch size further comprises:
setting the map data pre-fetch size equal to the aggregate transfer size, to reduce a number of map data transfers between the solid-state media and the map cache to process the sequential read requests.

17. The method of claim 16, wherein, by setting the map data pre-fetch size equal to the aggregate transfer size, data throughput is increased at least 10%.

18. The method of claim 15, wherein adjusting the map data pre-fetch size comprises:

when the current read request is a non-sequential read request:
  setting the map data pre-fetch size equal to a predefined size based on the transfer size of the current read request to reduce an amount of map data transferred between the solid-state media and the map cache to process the current read request.

19. The method of claim 18, wherein the predefined size comprises a smallest amount of data needed to process the entire transfer size of the current read request.

20. The method of claim 15, wherein, transferring map data including the corresponding map data from the solid-state media to a map cache of the media controller comprises:
  determining, based on the at least one logical address and transfer size, whether the corresponding map data is stored in the map cache;
  if the required map data is stored in the map cache, returning, by the map cache, a cache index of the map cache entry storing the required map data to the control processor.

21. The method of claim 20, wherein, if the corresponding map data is not stored in the map cache, the method comprises:
  allocating a number of entries in the map cache to store the corresponding map data, the number of allocated entries based on the adjusted map data pre-fetch size;
  transferring the map data including the corresponding map data from a logical unit of the solid-state media to a local cache of the solid-state media, the transfer having a size equal to the adjusted map data pre-fetch size; and
  transferring the map data including the corresponding map data from the local cache of the solid-state media to the map cache of the media controller, the transfer having a size equal to the adjusted map data pre-fetch size.

22. The method of claim 15, wherein, transferring user data from the one or more determined media addresses of the solid-state media to the host device comprises:
  transferring the user data from the determined media addresses in a logical unit of the solid-state media to a local cache of the solid-state media;
  transferring the user data from the local cache of the solid-state media to a buffer of the media controller; and
  forming one or more host protocol packets to transfer the user data from the buffer to the host device over a communication link operating in accordance with the host protocol.

23. The method of claim 22, comprising:
  when all of the user data of a read request is transferred to the host device, reporting completion of the read request to the host device.

24. The method of claim 15, comprising:
  determining whether a subsequent read request is received from the host device; and
  processing the subsequent read request as the current read request.

25. The method of claim 15, wherein the map data comprises a multi-level map having a plurality of leaf-level map pages, the plurality of leaf-level map pages stored in the solid-state media, each leaf-level map page comprising a plurality of map entries, each entry associated with one or more physical addresses of the solid-state media.

26. The method of claim 15, wherein the map data comprises a multi-level map, the multi-level map comprising:
  a second-level map having a plurality of second-level map pages, each of the second-level map pages having a plurality of entries, each entry configured to store a physical address of the solid state media; and
  a first-level map having a plurality of entries, each entry associated with a second-level map page, the first-level map configured to associate the at least one logical address and address range to at least one of the second-level map pages.

27. The method of claim 15, comprising:
  defining the sequential zone based on a logical address range of the one or more previous read requests, and determining that the current read request is within the sequential zone if the determined logical address of the current read request is within the logical address range of the one or more previous read requests.

28. A non-transitory machine-readable storage medium, having encoded thereon program code, wherein, when the program code is executed by a machine, the machine implements a method of of processing, by a solid-state drive (SSD) comprising a media controller and a solid-state media, a request received from a host device, the method comprising:
  determining, by a control processor of the media controller, a logical address, a transfer size, and map data based on the determined logical address and transfer size, associated with a received current read request from the host device;
  determining, by the control processor, based on the determined logical address and a sequential zone defined based on one or more previous read requests, whether the current read request is a sequential read request;
  adjusting, by the control processor, a map data pre-fetch size based on the transfer size of the current read request and whether the current read request is a sequential read request by adding the transfer size of the current read request with an aggregate transfer size of the one or more previous read requests when the current read request is a sequential read request;
  transferring a corresponding portion of the map data from the solid-state media to a map cache coupled to the control processor, the transferred portion having a size equal to the adjusted map data pre-fetch size;
  determining, based on the corresponding map data, one or more media addresses of the solid-state media associated with the determined logical address and transfer size; and
  transferring user data from the one or more determined media addresses of the solid-state media to the host device.

* * * * *